(12) United States Patent
Chadha

(10) Patent No.: US 9,185,466 B2
(45) Date of Patent: Nov. 10, 2015

(54) METHOD FOR PROVISIONING HIGH SPEED WIRELESS INFRASTRUCTURE

(76) Inventor: Rajan Chadha, Ealing (GB)

( * ) Notice: Subject to any disclaimer, the term of this patent is extended or adjusted under 35 U.S.C. 154(b) by 120 days.

(21) Appl. No.: 14/002,319

(22) PCT Filed: Mar. 25, 2011

(86) PCT No.: PCT/GB2011/000428
§ 371 (c)(1),
(2), (4) Date: Aug. 29, 2013

(87) PCT Pub. No.: WO2012/136947
PCT Pub. Date: Oct. 11, 2012

(65) Prior Publication Data
US 2013/0340013 A1 Dec. 19, 2013

(51) Int. Cl.
H04N 7/16 (2011.01)
H04N 21/61 (2011.01)
H04B 7/00 (2006.01)
H04H 20/00 (2009.01)
H04N 7/00 (2011.01)
H04W 84/00 (2009.01)

(52) U.S. Cl.
CPC ............. *H04N 21/6181* (2013.01); *H04B 7/00* (2013.01); *H04H 20/00* (2013.01); *H04N 7/00* (2013.01); *H04W 84/00* (2013.01)

(58) Field of Classification Search
CPC .............. H04B 7/00; H04B 1/04; H04B 1/16; H04N 21/6181; H04N 21/4788; H04N 21/6131; H04N 7/00; H04N 7/15; H04N 21/2223; H04N 2007/1739; H04N 21/6143; H04N 21/6175; H04N 7/10; H04N 7/106; H04N 7/17309; H04N 7/20; H04N 21/41407; H04N 21/6112; H04N 7/17318; H04N 21/4223; H04N 21/472; H04N 21/47202; H04N 21/475; H04W 84/00; H04W 84/02; H04W 24/04; H04W 40/00; H04W 88/08; H04W 92/20; H04W 4/046; H04W 4/06; H04W 84/18; H04W 88/02; H04W 88/085
See application file for complete search history.

(56) References Cited

U.S. PATENT DOCUMENTS

2010/0177759 A1* 7/2010 Fischer et al. ............... 370/345

* cited by examiner

Primary Examiner — Golam Sorowar
(74) Attorney, Agent, or Firm — Rajad Chadha; IBN Limited

(57) ABSTRACT

Several million television receive antennas installed on roof tops in the US and around the world. A method is disclosed that uses each of the millions of television receive antennas as transmitters to provide high speed wireless mobile and broadband infrastructure to send and receive internet, data, audio, video, at user locations and communication between devices and sensors securely. This is the first converged broadcast and broadband interactive wireless infrastructure utilizing the television as an interface for applications such as financial transactions, home-to-home interconnection, environmental, energy management (smart meters), social networking, streaming, gaming, and security management. A personal server connects to a television receiver and antenna which connects among them wirelessly and connect to a broadcasting site server and an electric-substation server. The invention creates wireless cloud eliminating the need of a personal computer. The method overcomes the problem of interference whist preserving latency, synchronization, and time accuracy.

2 Claims, 4 Drawing Sheets

METHOD FOR PROVISIONING HIGH SPEED WIRELESS INFRASTRUCTURE

CROSS REFERENCE TO RELATED APPLICATIONS

This application claims the benefit of application Ser. No. 09/167,164, filled on 23 Sep. 2009, published on 30 Mar. 2011 and UK patent GB247385B awarded on 27 May 2015.

Cross reference is also made to listed documents in the patent GB247385B

BACKGROUND

Low cost universal broadband access and its coverage is a key facilitator for digital applications. However, until now broadband availability and digital applications have been elusive in its penetration in the outskirts of urban and rural areas. As a result, this presents a lost opportunity in social and economic development.

The method detailed addresses the above issues by leveraging the broadcast infrastructure and digitally connecting millions of receive only television antennas, thus providing wireless infrastructure to provide internet, data, audio and video, mobile communications, and facilitating digital applications at a fraction of a cost of known access technologies.

The method detailed is based on broadcasting standards and methodology that combines broadcast and broadband through efficient modulation, monitoring, and processing techniques and is, therefore, different from previously cited work which is based on mobile communications, and IP addressing structure based on cellular methodology. The large area coverage is achieved by transmitting high effective isotropic power from broadcasting TV sites and directing the antenna beam dependent on population density. Moreover, the personal servers (PS) with built in transmitter and receiver and yagi antennas as mobile base stations can collaboratively form mobile infrastructure for devices. Millions of base stations implemented using new addressing scheme based on yagi geo location, subscriber address and broadcast site.

The method details self organising interference mitigation mechanism whereby channels can be dynamically allocated and effective isotropic radiated power reduced. The invention preserves and provides low latency, high synchronisation, and time accuracy independent of applications, high quality video for interactive games, video streaming, social networking, real time energy monitoring using smart meters and financial transaction on television.

DRAWINGS

Figure 1:
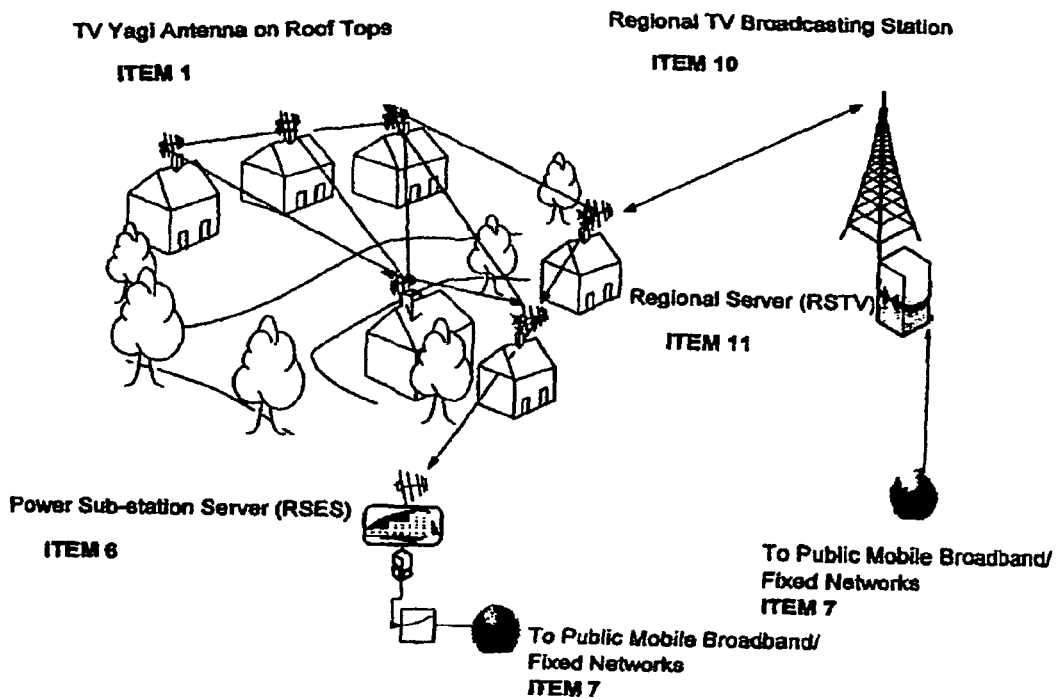
Figure 2:
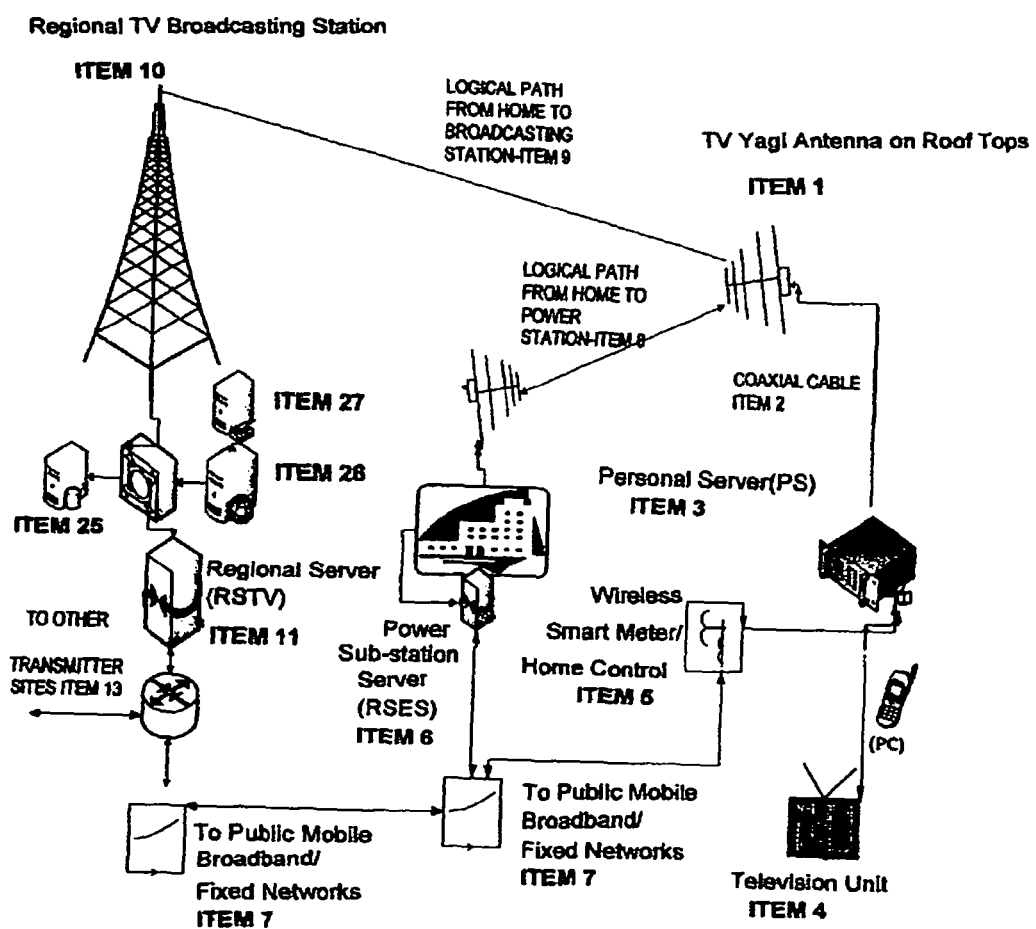

FIG. 1 provides the overview of the method to provide wireless infrastructure;

FIG. 2 illustrates connectivity and integration of power sub-station, broadcasting site, personal server connected to home television and directional antenna. Additionally, the drawing illustrates home to home interconnection; energy management (smart meters) and home control using television receive antennas as transmitters as well as connectivity to public mobile, broadband, and fixed networks.

Figure 3:
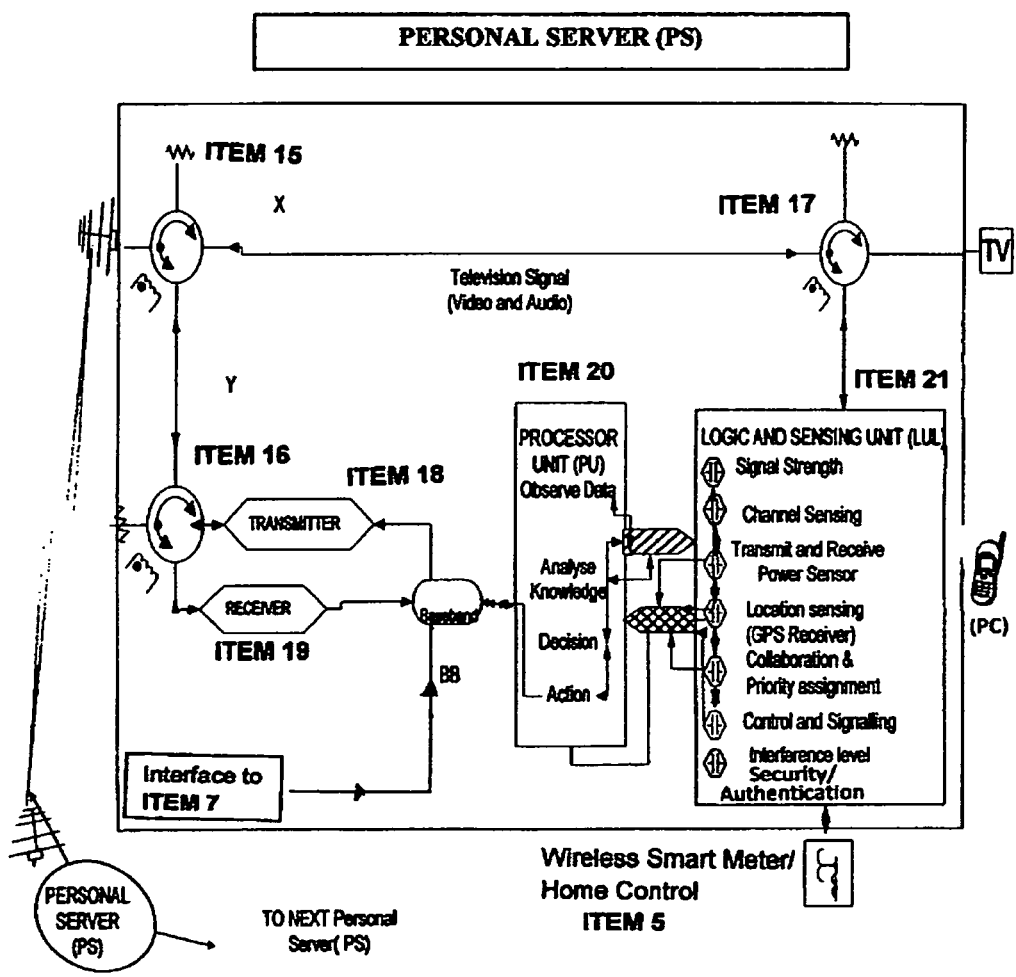

FIG. 3 provides overall diagram for the personal server and its features of the present invention. Additionally, it provides block diagram for processor unit, logical and sensing unit, baseband with transmit and receive capabilities of the present invention.

Figure 4:
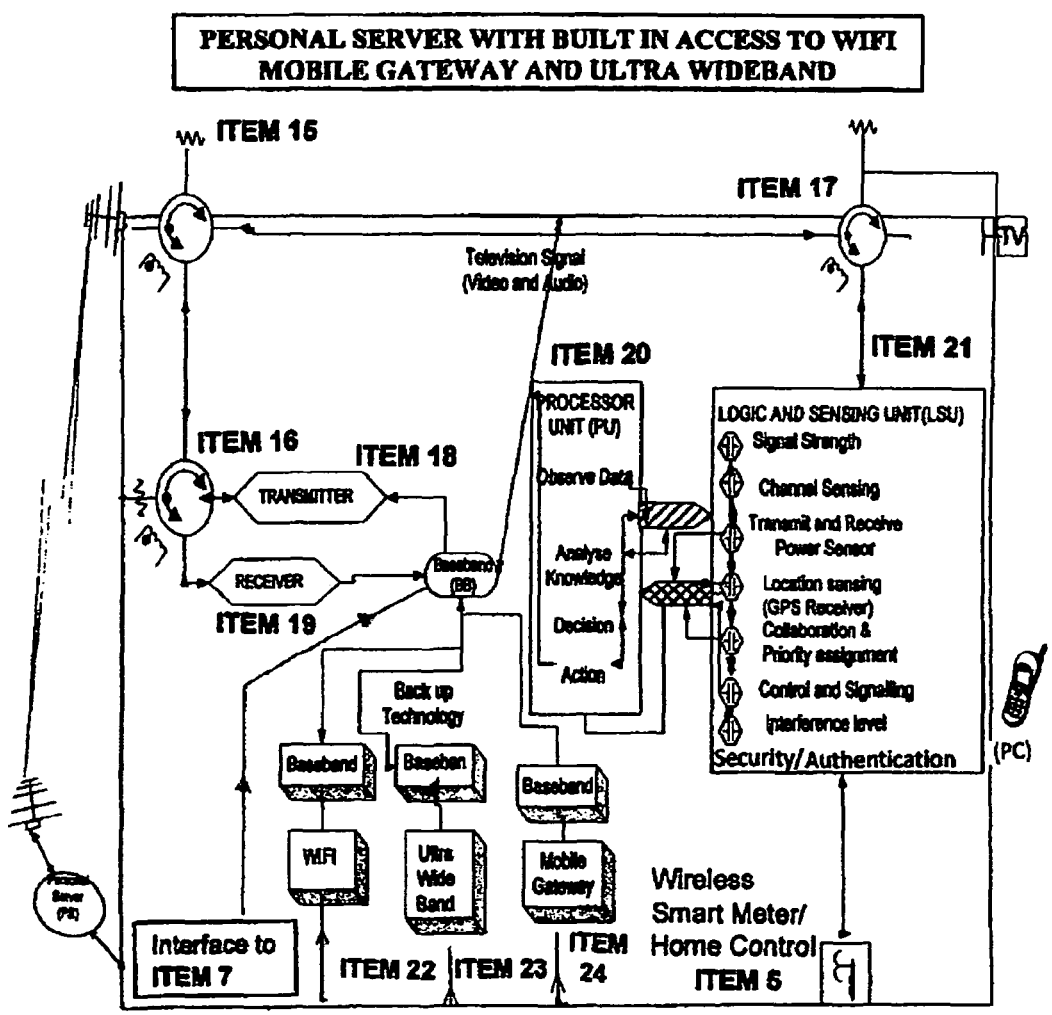

FIG. 4 provides functional diagram of personal server integration with built in access to WIFI, mobile gateway and ultra-wideband.

DESCRIPTION

A major barrier for the next generation high-speed wireless infrastructure is the speed, reliability, cost and long time of deployment, reach, and access, particularly penetration of infrastructure in remote areas. The method in this invention enables disadvantaged individuals to improve their position in society and encourage inclusion in the information society enabling them to diffuse upward in social mobility. The method provides a simple way for bridging social and digital engagement; this is accomplished by providing combined internet, broadcast and mobile services simultaneously on the television set but also on mobile devices.

The method detailed in the invention is concerned with the above and uses existing installed base of 30 million yagi television receiving antennas (community deployed assets) with a unique IP (Internet Protocol) address to provide a low cost home-to-home broadband wireless infrastructure and mobile communications where a television transmitting infrastructure is available. Each TV receiving yagi antenna (ITEM 1) forms a wireless radiating point connected to the personal server (PS, ITEM 3 in FIG. 2).

Due to the proximity of several yagi antennas, the method provides multiple routings through large number of neighbouring yagi antennas. As a result, the method provides low interference, high resilience wireless infrastructure.

The servers (RSTV, ITEM 11), located at the TV broadcasting sites, comprise of TV licensing database (ITEM 25), Spectrum database (ITEM 26), Policy Server (ITEM 27), shown in FIG. 2. The RSTV has built in receive (ITEM 16) and transmit (ITEM 17) systems, processing unit (PU, ITEM 20) and logical sensing unit (LU, ITEM 21), same as that of personal server (PS) shown in FIGS. 3 and 4, which wirelessly connects to Personal servers (PS) through roof top installed yagi antennas. Additional servers (RSES, ITEM 6) are located at the electric sub-stations. Only one physical connection for the RSES and RSTV exists to the public mobile gateways (ITEM 7). The method ensures that all traffic is routed via either RSTV or RSES.

The method uses servers at electric sub stations (RSES), currently located approximately 7 km of individual homes. The servers at the local electric sub stations (RSES) comprises of built in receive and transmit, processing unit (PU) and logical sensing unit (LU) systems which wirelessly connects to individual homes and manage energy using Smart meters (ITEM 5), shown in FIG. 2 but also provide broadband communications as sub net to the servers at the transmitting television sites (RSTV). The regional electricity serving company may also use their subscriber database to complement TV licensing database. The overview of the wireless infrastructure is shown in FIG. 1.

The method uses a low power Personal Server (PS, ITEM 3), inserted between television set and yagi antenna (ITEM 1). The Personal Server (PS) has built in logical and sensing unit (LSU, ITEM 21) which senses spectrum and channels, transmit (ITEM 18) and receive (ITEM 19) power, look up geo-location database, ranks and allocate channels and time slots depending on interference level. The method can use any channel from the entire VHF and UHF broadcast spectrum accept the operational television channel and channels on either side of the TV operational channel at any instant of time and location. The control channel is transparent allowing the personal server (PS) to determine usage on the basis of air time efficiency.

The signal processor units (PU, ITEM 20) observe data, analyse, decide, and take action to allocate channel and time slots to the link. The method invites number of yagis through links that elect to take the data forward on different channels and time slots. The most appropriate link is prioritised, selected, and decided by the channel sensing within the logic and sensing unit (LSU). Depending on the signal strength, carrier to interference and collision probability of channel and timeslot measurements, a logical path from a PS linked to the yagi to the server (RSTV), TV broadcasting station is formed and also at the server (RSES) at the local electric sub-station. Since the transmit power is low (less than 100 mW) no elaborate filtering is required for third order intermodulation interference or to protect microphone and other services. Some of the antenna installed will have yagi antenna polarisation discrimination, which assists in reducing further the interference. The PS has all the information installed to protect all services from interference.

The method uses radiating cells of varied dimensions for 'Home to Home' connection to ensure latency preservation and synchronisation. The method compares timings and location for each yagi provided by built in GPS and TV licensing data (ITEM 21). The method enables gigabit data streams using low cost multiplexing of channels and time slots that provide combined mobile, broadband, and real time interaction on television.

The method uses a personal communicator and Receptor (PC), which is a mobile phone and controller of applications on television. The personal communicator with built in personal server controls access to the internet on television and mobile communications. The PC comprises of interfaces that connects with public mobile gateway (Access Network) for public mobile networks. Detailed description of public mobile network is detailed in 3 G systems and Global System for Mobile communications (GSM) typical mobile communication system such as UMTS (Universal Mobile Telecommunications System), consists of a mobile station or user equipment has access to the mobile services offered by a core network via an access network. The access to the public network constitutes fail-safe network and to extend functionality to public networks.

The built in channel monitoring ensures that the said Personal Communicator and Receptor (PC) does not operate on the TV operational channel at the location.

The method assigns unique IP address to each yagi antenna attached to Personal Server (PS) for end-to-end communication to RSTV or RSES. The IP address is linked to the household, consisting of unique wireless network, television broadcasting sub-net, host yagi, donor yagi, and user identification via the television license database. The regional servers maintain a directory of TV license holders with a unique IP address for each household.

Radiating cells of varied dimensions form a new infrastructure for 'Home to Home' connection, education and community, gaming and social network, and combines internet, mobile and television. The application portability is achieved using standard transport service based on Transport Communication protocol/Internet Protocol (TCP/IP), therefore, the same infrastructure is used for different applications such as home automation, security and monitoring energy consumption via (RSES).

IP addressing scheme treat each sub-power station (RSES) as a sub-net that connects to regional servers, RSTV, at the broadcast transmission sites. Each (RSES) has an IP address to use at each sub-net and systems wishing to communicate with the (RSES) and all servers know to use these IP addresses.

Logical path is created by bouncing and re-transmission of radio waves from yagi to yagi to the broadcasting TV station sites using simple Transport Communication protocol/Internet Protocol (TCP/IP) connection oriented between Personal Server (PS) and Regional Servers (RSTV and for RSES). These servers interconnect using public broadband networks to a central operation and management using Simple Network Management Protocol (SNMP).

Ultra wide band and wifi capabilities with access to public network connectivity are built in PS; this method provides failsafe alternate communications independently of the yagi based infrastructure. Wi-Fi and Ultra wide band basebands and mobile gateways are converted to the ultra high frequency band for onward transmissions to personal servers (PS). The functional architecture is shown in FIG. 4.

The security, access controls and authentication is built in the RSTV, RSES servers and also built within the Personal Servers (PS). The standard TCP/IP protocols (such as IP SEC 6) are used based on password generation and distribution, an authentication process based upon user identity and password is used. The method also provides encryption at the application level for bulky and sensitive data.

The invention claimed is:

1. A method for providing high speed wireless mobile and broadband communication infrastructure, the method comprising:
    receiving, by a personal server device connected to a directional antenna at a user location, television broadcast data and internet data;
    sending, by the personal server device, internet data back to a TV broadcast transmitter via a network of antenna installed at user locations;
    receiving radio signals at an antenna connected to a circulator split signal in two branches,
    Wherein one branch carries the TV receive signal, and second branch carries the interact and data; second branch is further split into two branches namely transmit and receive branch connected to Baseband (BB),
    Wherein transmitter connected via circulator to the antenna is power limited to avoid interference to other systems,
    Wherein Baseband is driven by processing unit connected to logical and sensing unit;
    processing, logical, and sensing unit collaborate, analyse, make decisions, and instruct baseband to take actions to avoid interference by switching channels, reducing radiated power;
    integrating electric sub-station, broadcast and broadband,
    Wherein personal server communicates at user location and server at the electric sub-station to provide aggregate energy consumption to balance out supply and demand by sub-station;
    Wherein television connect to energy meters, and display energy consumption and prices on television screen and allow user to select energy supplier and conduct transactions using remote or mobile devices;
    Wherein the addressing scheme as an interact protocol scheme for connection to interact connected remote devices for energy demand supply management.

2. The method of claim 1, further comprising:
    addressing scheme formatted as internet protocol for connection with internet;
    Wherein the addressing scheme is structured to recognise user, broadcasting transmitter sites, donor and receiver antennas and include virtual addressing scheme to identify devices, users connected to the personal server and to establish voice, video, data communication and transactions between internet enabled devices and sensors securely and with minimum interference.

* * * * *